United States Patent
Tsuji

(10) Patent No.: US 9,258,481 B2
(45) Date of Patent: Feb. 9, 2016

(54) OBJECT AREA TRACKING APPARATUS, CONTROL METHOD, AND PROGRAM OF THE SAME

(71) Applicant: CANON KABUSHIKI KAISHA, Tokyo (JP)

(72) Inventor: Ryosuke Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 14/141,149

(22) Filed: Dec. 26, 2013

(65) Prior Publication Data
US 2014/0185875 A1  Jul. 3, 2014

(30) Foreign Application Priority Data

Dec. 27, 2012 (JP) .................................. 2012-286000

(51) Int. Cl.
*G06K 9/00* (2006.01)
*H04N 5/232* (2006.01)

(52) U.S. Cl.
CPC ........ *H04N 5/23219* (2013.01); *G06K 9/00228* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,563,678 A * | 10/1996 | Kusaka | ................. | G02B 7/346 396/121 |
| 6,038,554 A * | 3/2000 | Vig | .................... | G06Q 10/0875 705/306 |
| 7,315,630 B2 * | 1/2008 | Steinberg | ........... | G06K 9/00228 348/E5.038 |
| 7,929,042 B2 * | 4/2011 | Terashima | ............. | G03B 13/00 348/345 |
| 8,223,216 B2 * | 7/2012 | Matsuyama | ....... | H04N 5/23212 348/208.14 |
| 8,330,849 B2 * | 12/2012 | Ishii | .................... | H04N 5/23219 348/345 |
| 8,355,047 B2 * | 1/2013 | Takeuchi | ................ | G06T 7/204 348/169 |
| 8,564,661 B2 * | 10/2013 | Lipton | ............. | G08B 13/19608 348/143 |
| 9,094,610 B2 * | 7/2015 | Yoshino | ............... | H04N 1/0035 |
| 2006/0203107 A1 * | 9/2006 | Steinberg | ............... | H04N 5/232 348/239 |
| 2007/0247321 A1 * | 10/2007 | Okamoto | ............... | G06Q 10/08 340/573.1 |
| 2009/0009606 A1 * | 1/2009 | Takeuchi | ................ | G06T 7/204 348/169 |
| 2012/0201450 A1 * | 8/2012 | Bryant | .................... | H04N 1/60 382/162 |

FOREIGN PATENT DOCUMENTS

| | | | |
|---|---|---|---|
| JP | 2002-251380 A | 9/2002 |
| JP | 2005-318554 A | 11/2005 |
| JP | 2009-211311 A | 9/2009 |

* cited by examiner

*Primary Examiner* — Anand Bhatnagar
(74) *Attorney, Agent, or Firm* — Cowan, Liebowitz & Latman, P.C.

(57) ABSTRACT

An object area tracking apparatus has: a face detection unit for detecting a face area on the basis of a feature amount of a face from a supplied image; a person's body detection unit for detecting an area of a person's body on the basis of a feature amount of the person's body; and a main object determination unit for obtaining a priority for each of the objects by using detection results by the face detection unit and the person's body detection unit and determining a main object of a high priority, wherein for the object detected only by the person's body detection unit, the priority is changed in accordance with a past detection result of the object in the face detection unit.

12 Claims, 6 Drawing Sheets

OBJECT AREA TRACKING APPARATUS, CONTROL METHOD, AND PROGRAM OF THE SAME

BACKGROUND OF THE INVENTION

1. Field of the Invention

The present invention relates to an object area tracking apparatus and its control method and program.

2. Description of the Related Art

An image processing technique for automatically detecting a specific object pattern from an image is useful and can be used, for example, to specify an area of a person's face. Such an image processing technique can be used in many fields such as communication conference system, man-machine interface, security system, monitor system for tracking a person's face, image compression, and the like. In an image pickup apparatus such as digital camera, digital video camera, or the like, a specific object is detected from a photographed image and a detection result is set as a control target, thereby optimizing a focus and an exposure. For example, the Official Gazette of Japanese Patent Application Laid-Open No. 2005-318554 discloses a photographing apparatus which detects a position of a face of a person in an image to focus on the face and photographs the image under exposure which is optimum to the face. The Official Gazette of Japanese Patent Application Laid-Open No. 2009-211311also proposes image processing apparatus and method for detecting an upper half of a person's body from an image and counting the number of persons.

However, when the person's face is detected from the image, in the case where a feature of the face is not sufficiently obtained because the person is backward or the like, the face cannot be detected. In a case where the upper half of the person's body is detected from the image, even if the person is backward, the upper half can be detected. However, if the person is in a special attitude or if a portion of an area of the upper half of the person's body does not appear in the image, the upper half cannot be detected. That is, a detectable situation changes in dependence on a detecting method of the object. Therefore, in order to reduce a situation where the object cannot be detected and to improve a detection rate, a method whereby different detecting methods are used together is considered. For example, by using a result of the detection of the person's body for the object whose face could not be detected, the detection rate of the object can be improved.

There is a main object determination technique for selecting an object (main object) which is used in photographing control such as in-focusing or the like from the detected objects. In the case where a plurality of objects are detected, such a technique is used, for example, to select one main object to be subjected to adjustment of focus and exposure from the objects. The main object determination technique is required to automatically determine a target photographing object which the user intends to photograph.

By the detection of the person's body from the image, even in a state where the object is backward and the face cannot be seen, the object can be detected. However, even if the face could be detected, there is a case where the user does not want to select such a face as a main object. For example, in a scene in which a child or the like is always moving, in order to improve stability of the detection and tracking of the object, the user also wants to use detection data at the time when the person is backward or the like, as data of the main object. When such a show that a mascot is dancing is photographed, there is a case where an audience who is backward happens to be taken into a picture. In such a scene, even if the audience who is backward could be detected, the user does not want to select such an image as a main object.

SUMMARY OF THE INVENTION

The invention is made in consideration of the foregoing problems and, it is an aspect of the invention to enable a main object to be appropriately selected by a plurality of different detecting methods from objects detected from an image in an object area tracking apparatus.

According to an aspect of the invention, an object area tracking apparatus for detecting a target object area from a supplied image and tracking the detected object area, comprises: a first detection unit configured to detect a predetermined object area from the image on the basis of a first feature amount; a second detection unit configured to detect a predetermined object area from the image on the basis of a second feature amount different from the first feature amount; and a main object determination unit configured to obtain a priority for each of the objects by using a detection result of the first detection unit and a detection result of the second detection unit and determine a main object of a high priority from the objects, wherein for the object which is not detected by the first detection unit and is detected by the second detection unit, the main object determination unit changes the priority in accordance with a detection result of the past of the object in the first detection unit.

According to another aspect of the invention, there is provided an object area tracking apparatus for detecting a target object area from a supplied image and tracking the detected object area, comprising: a first detection unit configured to detect a face area of an object from the image; a second detection unit configured to detect a predetermined area different from the face area of the object from the image; and a main object determination unit configured to determine a main object on the basis of a detection result of the first detection unit and a detection result of the second detection unit, wherein the main object determination unit selects a main object from the objects whose face areas are detected by the first detection unit including the past objects.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

Figure 1:
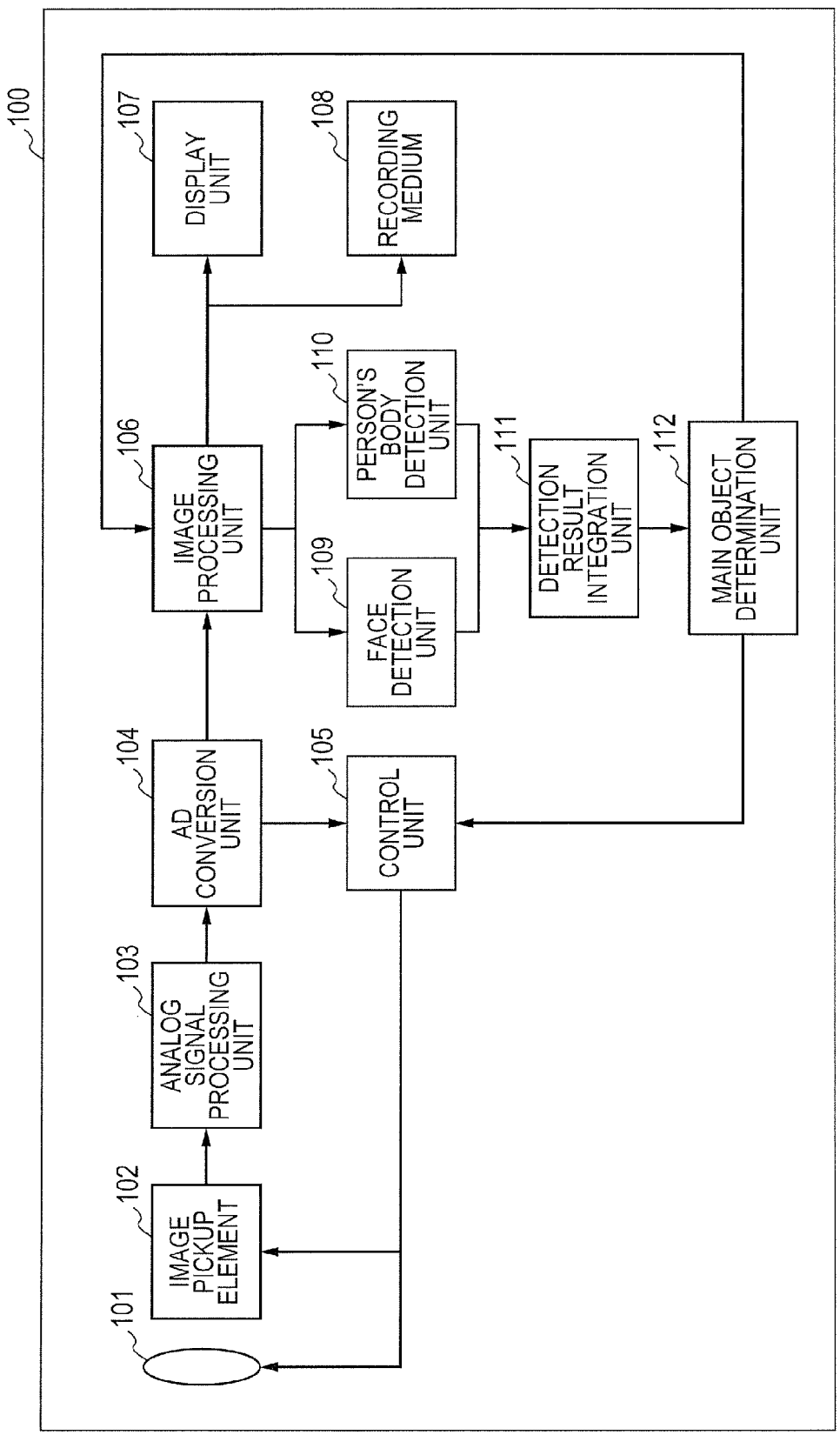
FIG. 1 is a diagram illustrating an example of a construction of an image pickup apparatus according to an embodiment of the invention.

FIG. 1 is a block diagram illustrating an example of a construction of an image pickup apparatus 100 having an object area tracking apparatus according to an embodiment of the invention. The image pickup apparatus 100 in the present embodiment has: a face detection unit 109 for setting an object area of a target detection object to an area of a person's face and detecting the person's face area from an image; and a person's body detection unit 110 for detecting an area of a person's body.

In the image pickup apparatus 100, light forming an object image is converged by an image pickup optical system 101 including an image pickup lens and enters an image pickup element 102. The image pickup element 102 is, for example, a Charge Coupled Device (CCD) image sensor or a Complementary Metal Oxide Semiconductor (CMOS) image sensor. The image pickup element 102 has a plurality of pixels each having a photoelectric conversion element and outputs an electric signal corresponding to an intensity of the incident light on a pixel basis. That is, the electric signal which is output from the image pickup element 102 is a signal obtained by photoelectrically converting the light showing the incident object image by the image pickup element 102 and is an analog image signal showing an image including the object image picked up by the image pickup element 102.

An analog signal processing unit 103 performs an analog signal processing such as Correlated Double Sampling (CDS) or the like to the image signal which was output from the image pickup element 102. An AD (analog/digital) conversion unit 104 converts the analog image signal which is output from the analog signal processing unit 103 into a format of digital data. The image signal of the digital format converted by the AD conversion unit 104 is input to a control unit 105 and an image processing unit 106.

The control unit 105 is a Central Processing Unit (CPU), a microcontroller, or the like and central-controls the operation of the image pickup apparatus 100. The control unit 105 develops a program code stored in a Read Only Memory (ROM) (not shown) into a work area in a Random Access Memory (RAM) (not shown) and sequentially executes it, thereby controlling each functional unit of the image pickup apparatus 100.

The image processing unit 106 executes an image processing such as gamma correction, white balance processing, or the like to the image signal of the digital format which is input. In addition to the ordinary image processing, the image processing unit 106 has a function for executing an image processing using information regarding a specific object area in an image which is supplied from a main object determination unit 112, which will be described hereinafter.

A display unit 107 is, for example, a Liquid Crystal Display (LCD) or an organic Electroluminescence (EL) display and displays an image on the basis of the image signal which is supplied from the image processing unit 106. The image pickup apparatus 100 displays the images picked up sequentially by the image pickup element 102 in a time-sequential manner onto the display unit 107, thereby enabling the display unit 107 to function as an electronic viewfinder (EVF). The display unit 107 can display a position or the like of the object area selected by the main object determination unit 112, which will be described hereinafter. The image signal which was output from the image processing unit 106 can be recorded into a recording medium 108. The recording medium 108 is, for example, a memory card which is detachable to the image pickup apparatus 100. A recording medium on which the image signal is recorded may be a memory built in the image pickup apparatus 100 or an external apparatus connected to the image pickup apparatus 100 so that it can communicate therewith.

The face detection unit 109 is an example of a first detection unit. The face detection unit 109 receives the image signal supplied from the image processing unit 106, detects a predetermined target object in the image, and specifies an object area. The face detection unit 109 specifies a person's face area as an object area from the image. If faces of a plurality of persons exist in the image, areas of the number as many as the number of persons are detected. As a detecting method in the face detection unit 109, a well-known face detecting method may be applied. In the related arts regarding the face detection, for example, there are a method whereby knowledge (flesh color information, parts such as eyes, nose, mouse, and the like) regarding the face is used, a method whereby a discriminator for face detection is constructed by a learning algorithm represented by a neural network, and the like. In the face detection, in order to improve a recognition rate, generally, the face recognition is performed by combining those methods. For example, as disclosed in the Official Gazette of Japanese Patent Application Laid-Open No. 2002-251380, a method whereby the face detection is performed by using a wavelet conversion and an image feature amount or the like can be mentioned. The detection result by the face detection unit 109 is supplied to a detection result integration unit 111, which will be described hereinafter.

The person's body detection unit 110 is an example of a second detection unit. The person's body detection unit 110 receives the image signal supplied from the image processing unit 106, sets a target object area to an area of an upper half of the person's body, and detects a predetermined area from the image. If a plurality of persons exist in the image, areas of the number as many as the number of persons are detected. As a detecting method in the person's body detection unit 110, for example, a method disclosed in the Official Gazette of Japanese Patent Application Laid-Open No. 2009-211311 or the like can be applied. In the embodiment, the person's body detection unit 110 sets an edge intensity of a contour of a local upper half of the person's body to a local feature amount and detects an area of the upper half of the person's body. As a method of extracting the feature amount from the image, there are various kinds of methods such as Sobel filter, Prewitt filter, Haar filter, and the like. An upper half of the person's body and a non-upper half of the person's body are discriminated from the extracted local feature amount by a person discriminator. The discrimination in the person discriminator is performed on the basis of a machine learning such as AdaBoost learning or the like. A detection result in the person's body detection unit 110 is supplied to the detection result integration unit 111, which will be described hereinafter.

The detection result integration unit 111 compares a detection result in the face detection unit 109 with the detection result in the person's body detection unit 110, integrates the detection results for the same object, and supplies a result of the integration to the main object determination unit 112. The detection result integration unit 111 makes correspondence between the same object and the detection result thereof among the detection results at different times. That is, by judging the detection results for the same object in the time axis direction, the detection result integration unit 111 plays a role of tracking the object. The detection result integration unit 111 will be described in detail hereinafter.

On the basis of a detection result supplied from the detection result integration unit 111, the main object determination unit 112 determines an object (main object) which is mainly handled from the detected objects.

Information regarding the determined main object is supplied to, for example, the control unit 105 and the image processing unit 106. The main object determination unit 112 determines whether or not the object detected only by the person's body detection unit 110 is selected as a candidate of the main object in accordance with detection results of the present and past face detections for the detected object. If a plurality of candidates of the main object exist, the main object determination unit 112 selects the main object on the basis of a position and a size of the detected object in the image. A processing of the main object determination unit 112 will be described in detail hereinafter.

The control unit 105 can control image pickup conditions such as focusing state, exposure state, and the like, for example, at the time when an object is picked up by the image pickup element 102. For example, the control unit 105 controls a focus control mechanism (not shown) and an exposure control mechanism (not shown) of the image pickup optical system 101 on the basis of the image signal which is output from the AD converter 104. For example, the focus control mechanism is an actuator or the like for driving the image pickup lens included in the image pickup optical system 101, and the exposure control mechanism is an actuator or the like for driving an iris and a shutter included in the image pickup optical system 101.

In the control of the focus control mechanism and the exposure control mechanism, the control unit 105 can use information of the object area supplied from the main object determination unit 112. For example, the control unit 105 can perform the focus control using a contrast value of the object area and the exposure control using a luminance value of the object area. Therefore, the image pickup apparatus 100 has a function for executing an image pickup processing under the image pickup conditions in consideration of a specific object area in the picked-up image. The control unit 105 also controls output timing of the image pickup element 102 and a read-out of the image pickup element 102 such as an output pixel or the like. In the construction illustrated in FIG. 1, the functions as an object area tracking apparatus according to the present embodiment are realized by, for example, the image processing unit 106, face detection unit 109, person's body detection unit 110, detection result integration unit 111, and main object determination unit 112.

Figure 2:
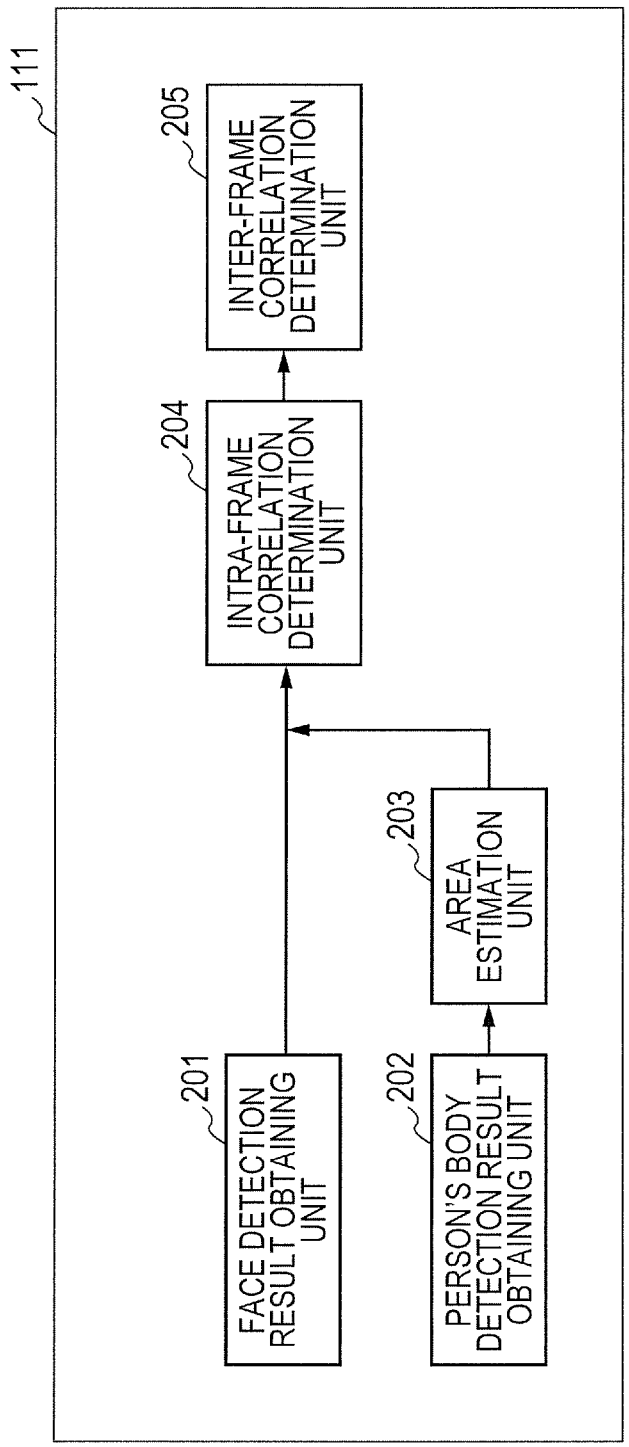
FIG. 2 is a diagram illustrating an example of a construction of a detection result integration unit in the embodiment.

FIG. 2 is a block diagram illustrating an example of a construction of the detection result integration unit 111. The detection result integration unit 111 has a face detection result obtaining unit 201, a person's body detection result obtaining unit 202, an area estimation unit 203, an intra-frame correlation determination unit 204, and an inter-frame correlation determination unit 205.

The face detection result obtaining unit 201 obtains a result detected by the face detection unit 109. As a detection result, the face detection result obtaining unit 201 obtains the number of persons detected, positions and sizes showing the areas in the image of the persons of the number as many as the number of detected persons, a reliability of the detection result, and the like. The person's body detection result obtaining unit 202 obtains a result detected by the person's body detection unit 110. As a detection result, the person's body detection result obtaining unit 202 obtains the number of persons detected, positions and sizes showing the areas in the image of the persons of the number as many as the number of detected persons, a reliability of the detection result, and the like. The area estimation unit 203 estimates a partial area corresponding to the area detected by the face detection unit 109 from the detection result obtained by the person's body detection result obtaining unit 202. As an estimating method, it is now assumed that, for example, the partial area is estimated by a linear conversion on the basis of a relation between the detection area by the face detection unit 109 and the detection area by the person's body detection unit 110.

The intra-frame correlation determination unit 204 specifies a detection result for the same object on the basis of a similarity of the positions and sizes between the detection result obtained by the face detection result obtaining unit 201 and the detection result obtained by the person's body detection result obtaining unit 202 and estimated by the area estimation unit 203. It is assumed that each of the face detection unit 109 and the person's body detection unit 110 detects the target object area on the basis of the images picked up at the same time. The intra-frame correlation determination unit 204 sets the object detected by the face detection unit 109 to the face detection result. With respect to the object detected only by the person's body detection unit 110, the intra-frame correlation determination unit 204 sets the result estimated as a partial area corresponding to the face area by the area estimation unit 203 to the detection result.

The inter-frame correlation determination unit 205 compares the current detection result by the intra-frame correlation determination unit 204 with the immediately preceding detection result by the detection result integration unit 111 and specifies a detection result for the same object. In a manner similar to the intra-frame correlation determination unit 204, the inter-frame correlation determination unit 205 specifies a detection result for the same object on the basis of the similarity of the positions and sizes between the detection results. A detection result of the past of each object can be referred to by making correspondence of the detection result in the time axis direction by the inter-frame correlation determination unit 205.

Figure 3:
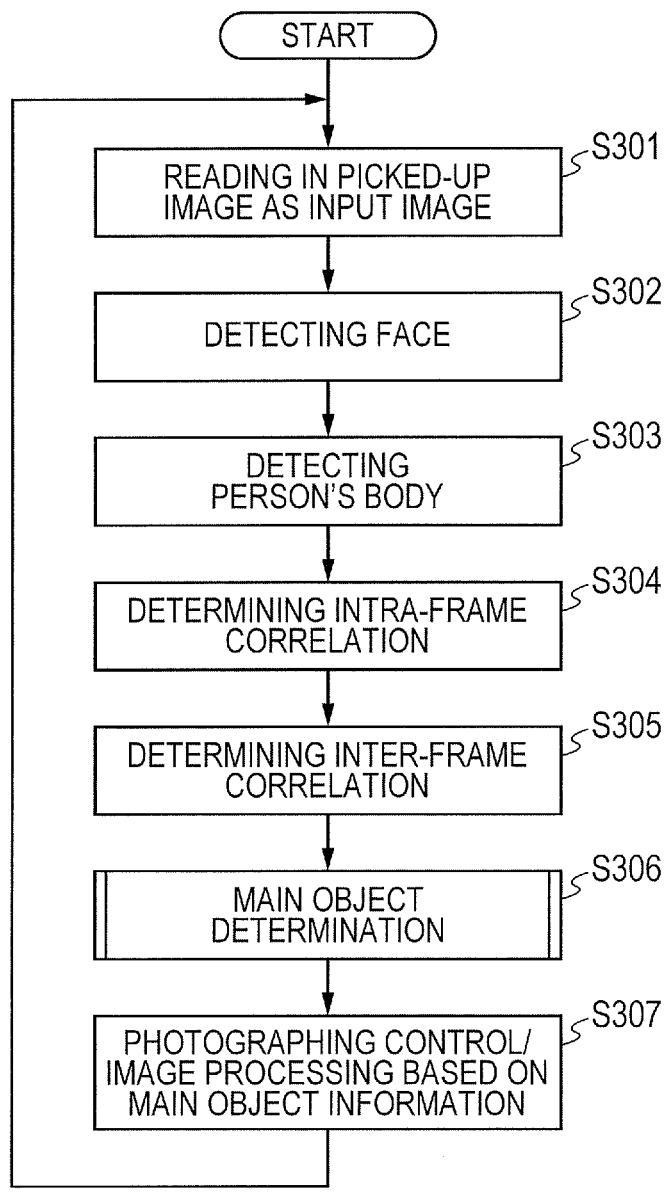
FIG. 3 is a flowchart illustrating an example of a processing of the image pickup apparatus in the embodiment.

A flow for the processing mainly regarding the main object determination in the image pickup apparatus 100 according to the present embodiment will be described with reference to FIG. 3. The image processing unit 106 reads the image, as an input image, obtained by converting the picked-up image obtained through the image pickup element 102 into the digital data by the AD conversion unit 104 (S301). Subsequently, the face detection unit 109 detects a face area on the basis of feature amount data (first feature amount) of the face from the input image and outputs detection data (S302). As detection data by the face detection unit 109, the number of detection results and the positions and sizes of the detection results in the image, the reliability of the detection result, and the like are obtained. The person's body detection unit 110 detects an area of a person's body on the basis of feature amount data (second feature amount) of the person's body from the input image and outputs detection data (S303). As detection data by the person's body detection unit 110, the number of detection results and the positions, sizes, and directions of the detection results in the image, the reliability of the detection result, and the like are obtained. Processing order of steps S302 and S303 shown in FIG. 3 is not limited.

Figure 4:
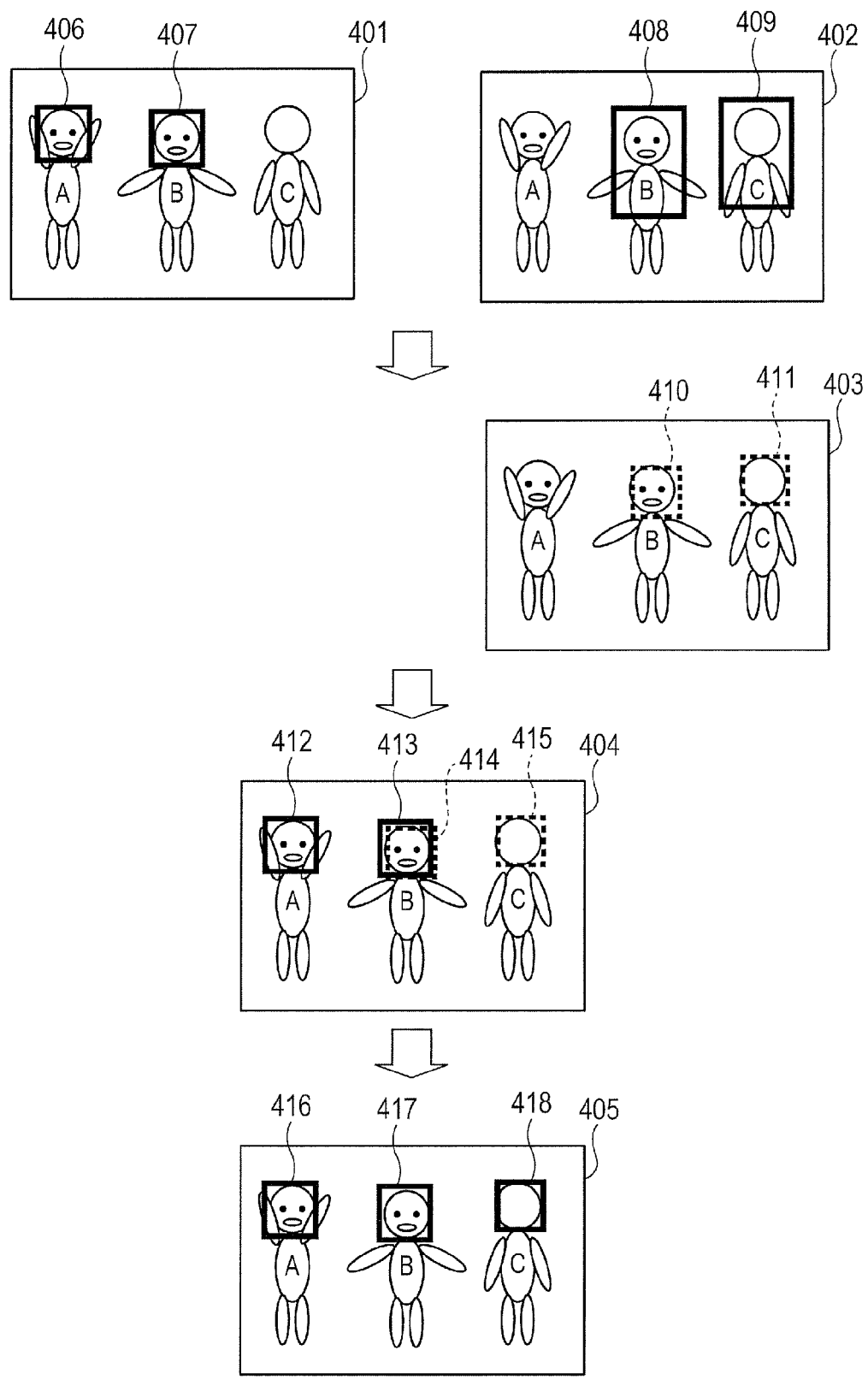
FIG. 4 is a diagram for describing a processing in an intra-frame correlation determination unit in the embodiment.

Subsequently, the detection result integration unit 111 integrates two types of detection results by the intra-frame correlation determination between the detection result in the face detection unit 109 obtained in the same frame (photographed images at the same time) and the detection result in the person's body detection unit 110 (S304). An integration processing of the detection results by the intra-frame correlation determination unit 204 of the detection result integration unit 111 will now be described with reference to FIG. 4. In FIG. 4, reference numerals 401 to 405 denote photographed images at the same time and their processing steps differ. In the images 401 to 405, persons are schematically expressed and an object A, an object B, and an object C are illustrated in order from the left. In FIG. 4, reference numerals 406 to 418 denote detection areas in the respective processing steps.

The image 401 indicates the face detection result obtained by the face detection result obtaining unit 201. As shown in the rectangles 406 and 407 of solid lines, in the objects A and B, the face areas are detected, and in the object C, since it is backward, it is assumed that a face area is not detected. The image 402 indicates the person's body detection result obtained by the person's body detection result obtaining unit 202. As shown in the rectangles 408 and 409 of solid lines, in the objects B and C, the face areas are detected, and in the object A, it is assumed that an area of the person's body is not detected due to an influence of the attitude.

The image 403 indicates the result in which a partial area corresponding to the face area detected by the face detection unit 109 is estimated by the area estimation unit 203 from the result of the person's body detection result obtaining unit 202. The rectangle 410 of a broken line indicates the result estimated from the area of the person's body shown by the rectangle 408 of the solid line. The rectangle 411 of a broken line indicates the result estimated from the area of the person's body shown by the rectangle 409 of the solid line.

The image 404 indicates the state of a processing in the intra-frame correlation determination unit 204. It is assumed that the rectangles 412 and 413 of solid lines are the detection results obtained by the face detection result obtaining unit 201. It is assumed that the rectangles 414 and 415 of broken lines are the detection results obtained by the person's body detection result obtaining unit 202 and estimated by the area estimation unit 203. In the detection results shown by the rectangles 412 and 413 of the solid lines and the detection results shown by the rectangles 414 and 415 of the broken lines, the intra-frame correlation determination unit 204 calculates a degree of similarity of the area shapes and position coordinates. If the calculated degree of similarity is equal to or larger than a predetermined threshold value, the intra-frame correlation determination unit 204 determines that the detection results are the detection results for the same object. If the calculated degree of similarity is less than the predetermined threshold value, it is determined that the detection results are the detection results for the different objects. In the example of the image 404 illustrated in FIG. 4, the rectangles 413 and 414 are determined as detection results for the same object. In another combination, it is determined that they are the detection results for the different objects.

The image 405 indicates the result obtained by integrating the data of the face detection and the data of the person's body detection as a result of the processing in the intra-frame correlation determination unit 204. In the objects A and B, since they have the result of the face detection, the face detection result is used as integration data. On the other hand, in the object C, since only the detection result of the person's body is detected, the result obtained by estimating the face area from the person's body detection result is used as integration data. Therefore, the detection results shown by the rectangles 416 and 417 of the solid lines are the detection results obtained by the face detection result obtaining unit 201, and the detection result shown by the rectangle 418 of the solid line is the face area estimated by the area estimation unit 203.

Returning to FIG. 3, after the data of the face detection and the data of the person's body detection are integrated by the intra-frame correlation determination in step S304, an inter-frame correlation determination by the inter-frame correlation determination unit 205 is performed (S305). In the inter-frame correlation determination, in the immediately preceding detection result by the detection result integration unit 111 and the current detection result by the intra-frame correlation determination, the detection results for the same object are specified. While the intra-frame correlation determination unit 204 performs the correlation determination of the different detection data for the images at the same time, the inter-frame correlation determination unit 205 performs the correlation determination of the detection data at the different times. In a manner similar to the intra-frame correlation determination unit 204, the inter-frame correlation determination unit 205 specifies the detection results for the same object on the basis of the similarity of the positions and sizes of the detection results. By the inter-frame correlation determination in the inter-frame correlation determination unit 205, the same object can be specified in a direction of a time axis. What making correspondence of the object in the time axis direction is completed means, in other words, that the object is being tracked.

Subsequently, the main object determination unit 112 executes a main object determination processing for selecting candidates of the main object from the detection data obtained by the detection result integration unit 111 and determining the main object (S306). The image pickup apparatus 100 executes photographing control and an image processing on the basis of information of the determined main object (S307). Subsequently, when a new photographed image is obtained, the foregoing processings in steps S301 to S307 are repetitively executed.

Figure 5:
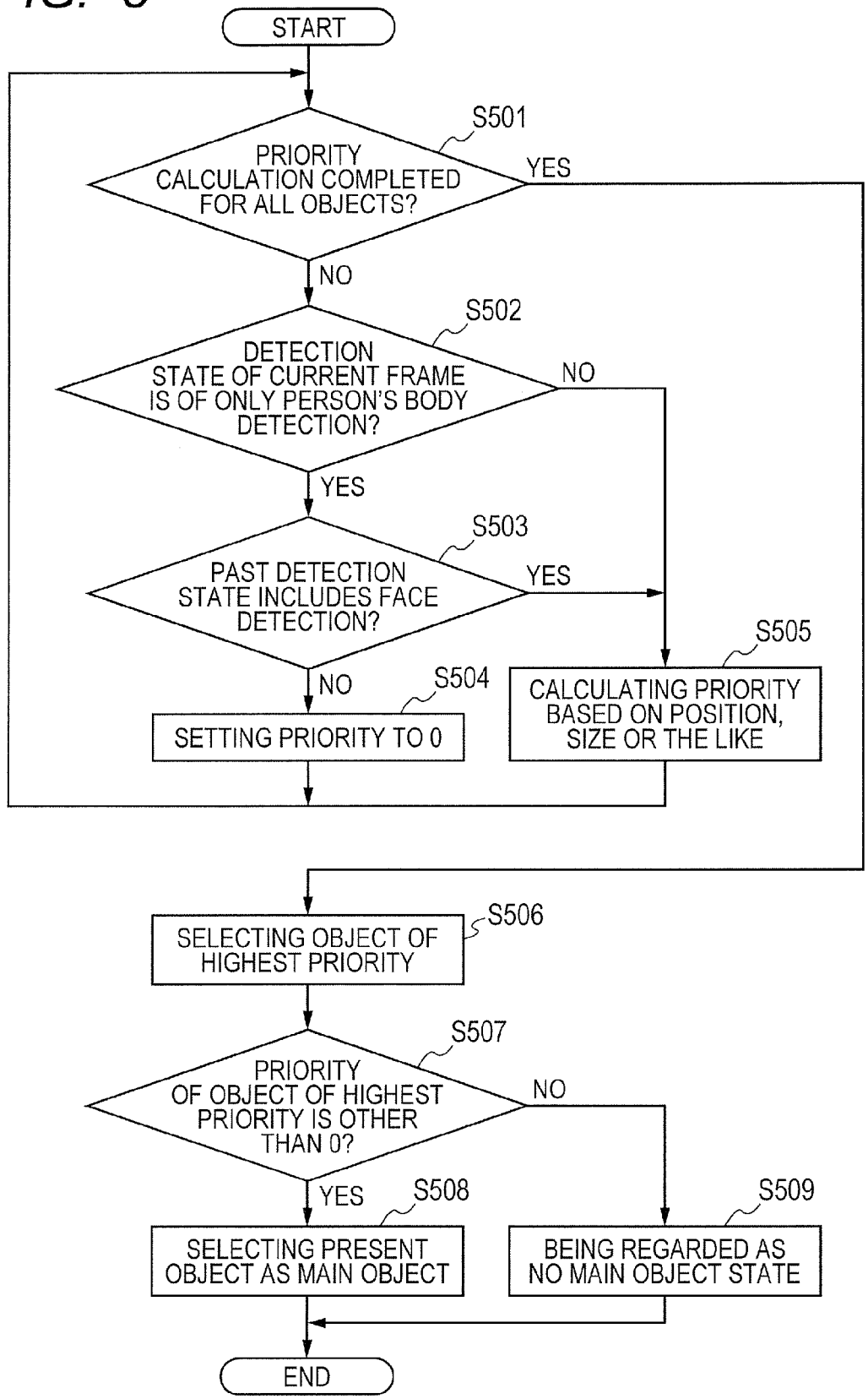
FIG. 5 is a flowchart illustrating a processing of a main object determination in the embodiment.

A flow for the main object determination processing by the main object determination unit 112 in step S306 shown in FIG. 3 will be described with reference to FIG. 5. First, to all of the detected objects by the detection result integration unit 111, the main object determination unit 112 discriminates whether or not the calculation of the priority for the main object determination is executed (S501). If the detected object in which the calculation of the priority is not performed exists (NO in S501), the main object determination unit 112 confirms a detection result in the present frame of the object (S502). It is assumed that the detection result shows that the object is detected by the face detection and/or the person's body detection.

In the case of the object detected only by the person's body detection by the person's body detection unit 110 (YES in S502), the main object determination unit 112 discriminates whether or not the past detection result of the object includes the face detection by the face detection unit 109 (S503). In the case of the detected object in which there is no face detection result in the past (NO in S503), the main object determination unit 112 handles the priority of the object as 0 (S504). The processing routine is returned to step S501. On the other hand, in the case of the detected object including the face detection result in the past (YES in S503), the main object determination unit 112 calculates the priority for the object on the basis of the position, size, and the like (S505). If the detection situation in the present frame is based on only the person's body detection by the person's body detection unit 110 (NO in S502), the main object determination unit 112 calculates the priority for the object on the basis of the position, size, and the like (S505). After the priority is calculated, the processing routine is returned to step S501.

In other words, in the case of the detected object including the detection data in the face detection by the face detection unit 109 in the present and past, the main object determination unit 112 sets the detected object to a candidate of the main object and executes the calculation of the priority. If the detected object does not include the detection data in the face detection by the face detection unit 109 in the present and past, the main object determination unit 112 sets the priority to 0 to indicate that the detected object is out of the candidates of the main object. It is assumed that the priority is set to a positive value and the minimum value thereof is 0.

Figure 6A:
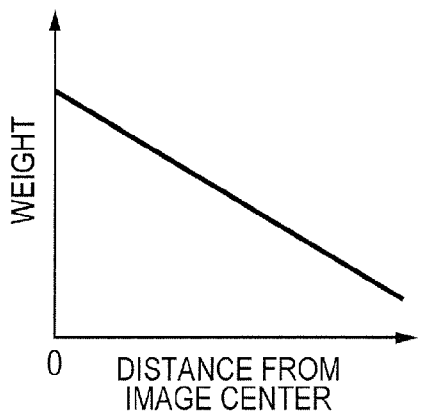
FIGS. 6A and 6B are diagrams for describing a priority in the main object determination in the embodiment.
Figure 6B:
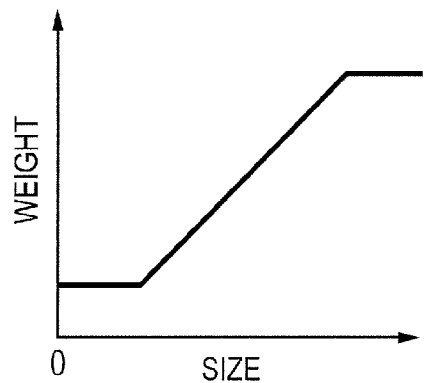

An example of the calculation of the priority in step S505 will now be described with reference to FIGS. 6A and 6B. In FIG. 6A, an axis of abscissa indicates a distance from the image center and an axis of ordinate indicates a positional weight in the priority calculation. The priority weight is set in such a manner that the smaller the distance between the image center and the detected object is, the larger the weight is, and the larger the distance between the image center and the detected object is, the smaller the weight is. In FIG. 6B, an axis of abscissa indicates a size of the detected object and an axis of ordinate indicates a size weight in the priority calculation. The priority weight is set in such a manner that the smaller the size of the detected object on the display screen is, the smaller the weight is, and the larger the size of the detected object on the display screen is, the larger the weight is. If the size of the detected object on the display screen is equal to or smaller than a first predetermined size, the weight is set to be constant. If the size of the detected object on the display screen is equal to or larger than a second predetermined size, the weight is set to be constant. A value obtained by multiplying those positional weight and size weight is handled as a priority. The priority calculation described above is an example and the setting of the weight is not limited to it. As an element of the weight, a reliability of the detection, a period of duration of the detection, or the like may be additionally considered.

Returning to FIG. 5, if the priority calculation is completed for all of the detected objects (YES in S501), the main object determination unit 112 selects the object of the highest priority from the detected objects (S506). If the priority of the selected object of the highest priority is other than 0 (YES in S507), the main object determination unit 112 selects such an object as a main object (S508). If the priority of the selected object of the highest priority is equal to 0 (NO in S507), the main object determination unit 112 performs a processing on the basis of that there is no main object (S509). That is, if all of the detected objects are the objects only by the person's body detection by the person's body detection unit 110 in the present and past, a state where no main object exists is resulted in.

The determination processing of step S503 has been described on the assumption that the determination is made on the basis of the presence or absence of the face detection by the face detection unit 109 in the past. In addition to the determination by the presence or absence of the face detection, a reliability of the face detection, a continuity, a position, a size, or the like may be added to the determination condition. The invention has been described with respect to the example in which in the case of the detected object in which there is no face detection result in the past in step S503, the priority to the detected object is set to 0. However, the invention is not limited to it. It is also possible to construct in such a manner that for the detected object in which there is no face detection result in the past, in step S505, the priority is obtained in a manner similar to that in the case of the detected object in which there is a face detection result in the past, and a value obtained by multiplying this priority by a coefficient such as 0.5 or the like less than 1 is set to the final priority. As mentioned above, by using such a construction that in the case of the detected object in which there is no face detection result in the past, the priority is changed to a small value, although the main object is backward all along, if other object is backward, it can be selected as a main object.

As mentioned above, according to the embodiment, in the detection of the object using the person's body detection as an auxiliary of the face detection in the object area tracking apparatus, in the case of using the detection data based on the person's body detection, the main object determination is performed in consideration of the detection result by the face detection of the object. Thus, such an error that a non-target object of the user is selected as a main object can be reduced. The main object is properly selected from the detected objects and the determination accuracy of the main object can be improved. More specifically speaking, in the object detection from the image using a plurality of different detecting methods, for the object which is not detected by the first detection unit but is detected by the second detection unit, the priority of the object is changed in accordance with the past detection result in the first detection unit. Thus, the main object can be properly selected from the detected objects in consideration of the past detection result in the first detection unit, and the determination accuracy of the main object can be improved.

Other Embodiments of the Invention

Although the embodiment has been described above with respect to the case, as an example, where the object area tracking apparatus is applied to the image pickup apparatus, the apparatus to which the object area tracking apparatus is applied is not limited to the image pickup apparatus. For example, the object area tracking apparatus for performing the object area tracking may be applied to a display apparatus for displaying an image (reproduction data) supplied from an external apparatus, recording medium, or the like. In the display apparatus, the reproduction data is used as data of the object area tracking processing and the object area tracking processing is executed. On the basis of the information (the position, size, and the like of the object in the image) of the object extracted by the object area tracking processing, the control unit such as a microcontroller or the like in the display apparatus controls display conditions at the time of displaying the image. Specifically speaking, a superimpose display of information showing the object such as a frame or the like to the position of the object in the image is performed, or control of brightness, color tone, and the like of the display image according to luminance and chrominance information of an object area is performed.

The invention is also realized by executing the following processing. That is, software (program) for realizing the functions of the embodiments mentioned above is supplied to a system or apparatus through a network or various kinds of storage media and a computer (or a CPU or MPU or the like) of the system or apparatus reads out the program and executes the processing in accordance with the program.

Figure 7:
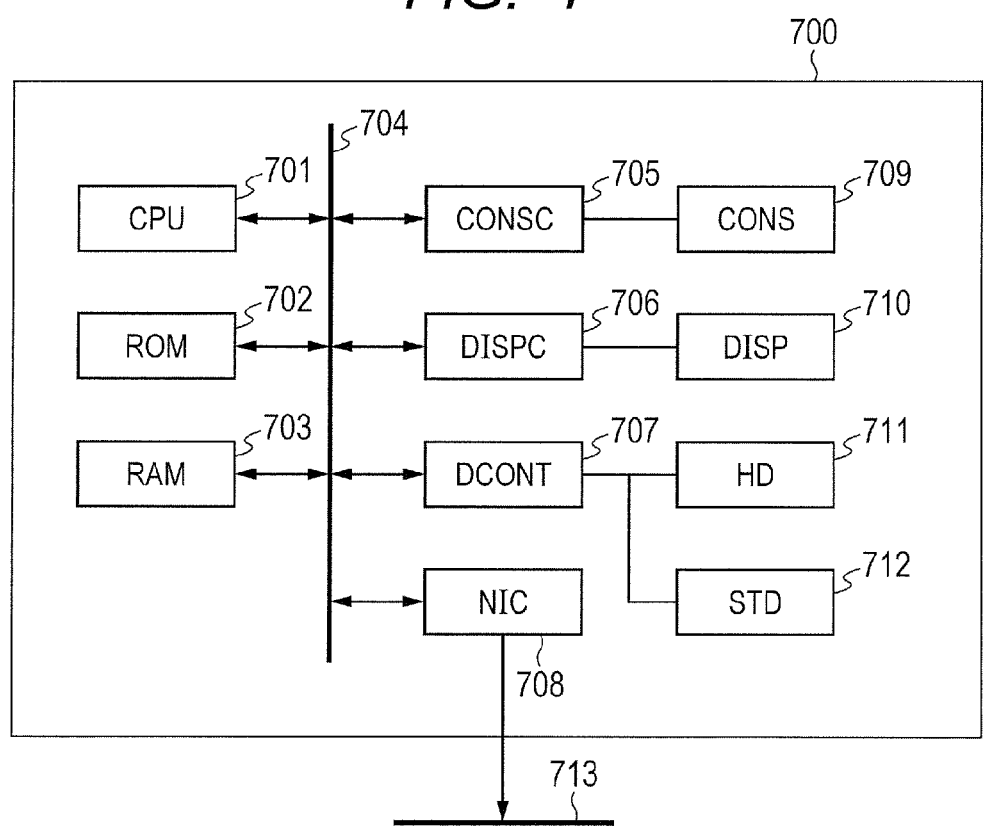
FIG. 7 is a diagram illustrating a computer function which can realize an object area tracking apparatus according to the embodiment of the invention.

For example, the object area tracking apparatus shown in the embodiments mentioned above has a computer function 700 as illustrated in FIG. 7 and the operation in the embodiments mentioned above is executed by a CPU 701. As illustrated in FIG. 7, the computer function 700 has the CPU 701, a ROM 702, and a RAM 703. The computer function 700 also has: a controller (CONSC) 705 of an operation unit (CONS) 709; and a display controller (DISPC) 706 of a display (DISP) 710 serving as a display unit such as an LCD or the like.

Further, the computer function 700 has: a controller (DCONT) 707 of a hard disk (HD) 711 and a storage device (STD) 712 such as a flexible disk or the like; and a network interface card (NIC) 708. Those functional units 701, 702, 703, 705, 706, 707, and 708 are connected through a system bus 704 so that they can communicate with each other.

The CPU 701 executes software stored in the ROM 702 or HD 711 or software which is supplied from the STD 712, thereby integratedly controlling each constructional unit connected to the system bus 704. That is, the CPU 701 reads out a processing program for executing the operation as mentioned above from the ROM 702, HD 711, or STD 712 and executes the processing program, thereby making control for realizing the operation in the embodiments mentioned above. The RAM 703 functions as a main memory, a work area, or the like of the CPU 701.

The CONSC 705 controls an instruction input from the CONS 709. The DISPC 706 controls a display of the DISP 710. The DCONT 707 controls an access to the HD 711 and STD 712 in which a boot program, various kinds of applications, a user file, a network management program, the processing program in the foregoing embodiments, and the like have been stored. The NIC 708 bidirectionally transmits and receives data to/from other apparatuses connected onto a network 713.

The foregoing embodiments are nothing but an example of embodiments for executing the present invention and the technical scope of the invention must not be restrictively interpreted. That is, the invention can be embodied in various forms without departing from the technical idea of the invention or a principal feature thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286000, filed on Dec. 27, 2012, which is hereby incorporated by reference herein in its entirety.

What is claimed is:

1. An object area tracking apparatus for detecting a target object area from a supplied image and tracking the detected object area, comprising:
   a first detection unit configured to detect a predetermined object area from the image on the basis of a first feature amount;
   a second detection unit configured to detect a predetermined object area from the image on the basis of a second feature amount different from the first feature amount; and
   a main object determination unit configured to obtain a priority for each of the objects by using a detection result of the first detection unit and a detection result of the second detection unit and determine a main object of a high priority from the objects,
   wherein for the object which is not detected by the first detection unit and is detected by the second detection unit, the main object determination unit changes the priority in accordance with a detection result of the past of the object in the first detection unit.

2. An apparatus according to claim 1, further comprising a detection result integration unit configured to compare the detection result of the first detection unit with the detection result of the second detection unit and integrate the detection results for the same object, and
   wherein the main object determination unit provides a priority for each of the detected objects shown by the detection result integrated by the detection result integration unit.

3. An apparatus according to claim 2, wherein for the object which is not detected by the first detection unit and is detected by the second detection unit, if the object is not detected by the first detection unit in the past, the main object determination unit decreases the priority to a value smaller than that in the case where the object is detected by the first detection unit in the past.

4. An apparatus according to claim 2, wherein for the object which is not detected by the first detection unit and is detected by the second detection unit, if the object is not detected by the first detection unit in the past, the main object determination unit does not determine that the object is the main object.

5. An apparatus according to claim 2, wherein the detection result integration unit is arranged to use, for the object having the detection result by the first detection unit, the detection result by the first detection unit as an integrated detection result and use, for the object having only the detection result by the second detection unit, an area where the detection result by the second detection unit is converted into a partial area corresponding to the object area which is detected by the first detection unit as an integrated detection result.

6. An apparatus according to claim 1, wherein when a plurality of objects are selected as candidates of the main object, the main object determination unit selects one object, as the main object, from the candidates of the main object on the basis of a position and a size of the object.

7. An apparatus according to claim 1, wherein the first detection unit detects an area of a person's face as an object area, and the second detection unit detects an area of a person's body as an object area.

8. An apparatus according to claim 1, wherein if the detection results of the object by the first detection unit in the present and past satisfy a condition for an element which is at least one of a reliability of the detection, a period of duration of the detection, a position, and a size, the main object determination unit selects the object as a candidate of the main object.

9. An image pickup apparatus comprising:
   an image pickup unit configured to supply a picked-up image;
   the object area tracking apparatus according to claim 1; and
   a control unit configured to control an image pickup condition in the image pickup unit in accordance with information of the object which is output by the object area tracking apparatus.

10. A display apparatus comprising:
    a display unit configured to display an image which is supplied;
    the object area tracking apparatus according to claim 1; and
    a control unit configured to control a display condition of the image in the display unit in accordance with information of the object which is output by the object area tracking apparatus.

11. A control method of an object area tracking apparatus for detecting a target object area from a supplied image and tracking the detected object area, comprising:
    a first detection step of detecting a predetermined object area from the image on the basis of a first feature amount;
    a second detection step of detecting a predetermined object area from the image on the basis of a second feature amount different from the first feature amount; and a main object determination step of obtaining a priority for each of the objects by using a detection result in the first detection step and a detection result in the second detection step and determining a main object of a high priority from the objects, wherein in the main object determination step, for the object which is not detected in the first detection step and is detected in the second detection step, the priority is changed in accordance with a detection result of the past of the object in the first detection step.

12. A non-transitory computer-readable storage medium storing a program for causing a computer to execute a control method of an object area tracking apparatus for detecting a target object area from a supplied image and tracking the detected object area, the control method comprising:

a first detection step of detecting a predetermined object area from the image on the basis of a first feature amount;

a second detection step of detecting a predetermined object area from the image on the basis of a second feature amount different from the first feature amount; and a main object determination step of obtaining a priority for each of the objects by using a detection result in the first detection step and a detection result in the second detection step and determining a main object of a high priority from the objects, wherein in the main object determination step, for the object which is not detected in the first detection step and is detected in the second detection step, the priority is changed in accordance with a detection result of the past of the object in the first detection step.

* * * * *